(12) United States Patent
Yamaki

(10) Patent No.: US 12,332,554 B2
(45) Date of Patent: Jun. 17, 2025

(54) PROJECTION SYSTEM

(71) Applicant: SEIKO EPSON CORPORATION, Tokyo (JP)

(72) Inventor: Eita Yamaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 175 days.

(21) Appl. No.: 18/181,772

(22) Filed: Mar. 10, 2023

(65) Prior Publication Data

US 2023/0288788 A1 Sep. 14, 2023

(30) Foreign Application Priority Data

Mar. 10, 2022 (JP) ................................. 2022-036898

(51) Int. Cl.
*G03B 21/56* (2006.01)
*G03B 21/14* (2006.01)

(52) U.S. Cl.
CPC ......... *G03B 21/142* (2013.01); *G03B 21/562* (2013.01)

(58) Field of Classification Search
CPC ....................... G03B 21/10; G03B 21/56–625
See application file for complete search history.

(56) References Cited

U.S. PATENT DOCUMENTS 9,921,460 B2 * 3/2018 Yamaguchi .......... G03B 21/145
2021/0116793 A1 * 4/2021 Ho ......................... A45C 11/00

FOREIGN PATENT DOCUMENTS

| JP | 2020204697 A |   | 12/2020 |              |
|----|-------------|---|---------|--------------|
| KR | 2017112489 A | * | 10/2017 | ............. G03B 17/54 |
| KR | 2020061185 A | * | 6/2020  | ........... G03B 21/145 |

* cited by examiner

*Primary Examiner* — Leon W Rhodes, Jr.
(74) *Attorney, Agent, or Firm* — Dority & Manning, P.A.

(57) ABSTRACT

A projection system includes a screen, an image projection device configured to project an image on the screen, and a carrying platform on which the image projection device is mounted, and which is configured to move, wherein the carrying platform includes a projection direction variable part which is configured to change a projection direction of the image, and a support mechanism configured to support the screen so as to adjust a position of the screen in a direction crossing an installation surface on which the carrying platform is installed.

4 Claims, 7 Drawing Sheets

PROJECTION SYSTEM

The present application is based on, and claims priority from JP Application Serial Number 2022-036898, filed Mar. 10, 2022, the disclosure of which is hereby incorporated by reference herein in its entirety.

BACKGROUND

1. Technical Field

The present disclosure relates to a projection system.

2. Related Art

In JP-A-2020-204697 (Document 1), there is disclosed a video display device provided with a projector for projecting a picture on a 3D screen, a projector holding stand capable of adjusting a height of the projector and a distance between the 3D screen and the projector, and a mounting platform capable of mounting and moving the 3D screen, the projector, and the projector holding stand.

However, in the configuration described in Document 1, since it is unachievable to dramatically change a position and an angle of the screen, there is a problem that the posture of the screen is fixed, and a predetermined video expression can only be made. In other words, it is requested to realize a variety of video expressions.

SUMMARY

A projection system includes a screen, an image projection device configured to project an image on the screen, and a carrying platform on which the image projection device is mounted, and which is configured to move, wherein the carrying platform includes a projection direction variable part which is configured to change a projection direction of the image, and a support mechanism configured to support the screen so as to adjust a position of the screen in a direction crossing an installation surface on which the carrying platform is installed.

DESCRIPTION OF AN EXEMPLARY EMBODIMENT

In each of the drawings described below, the description will be presented defining three axes perpendicular to each other as an X axis, a Y axis, and a Z axis. A direction along the X axis is referred to as an "X direction," a direction along the Y axis is referred to as a "Y direction," and a direction along the Z axis is referred to as a "Z direction," and an arrow direction is defined as a "+" direction while a direction opposite to the "+" direction is defined as a "−" direction. It should be noted that the +Z direction is also referred to as an "upper side" or "above" and the −Z direction is also referred to as a "lower side" or "below" in some cases, and a view from the +Z direction is also referred to as a plan view or "planar." Further, the description will be presented defining a surface at a "+" side in the Z direction as an upper surface, and a surface at a "−" side in the Z direction which is an opposite side thereto as a lower surface.

First, with reference to FIG. 1 and FIG. 2, a configuration of a projection system 1000 will be described.

Figure 1:
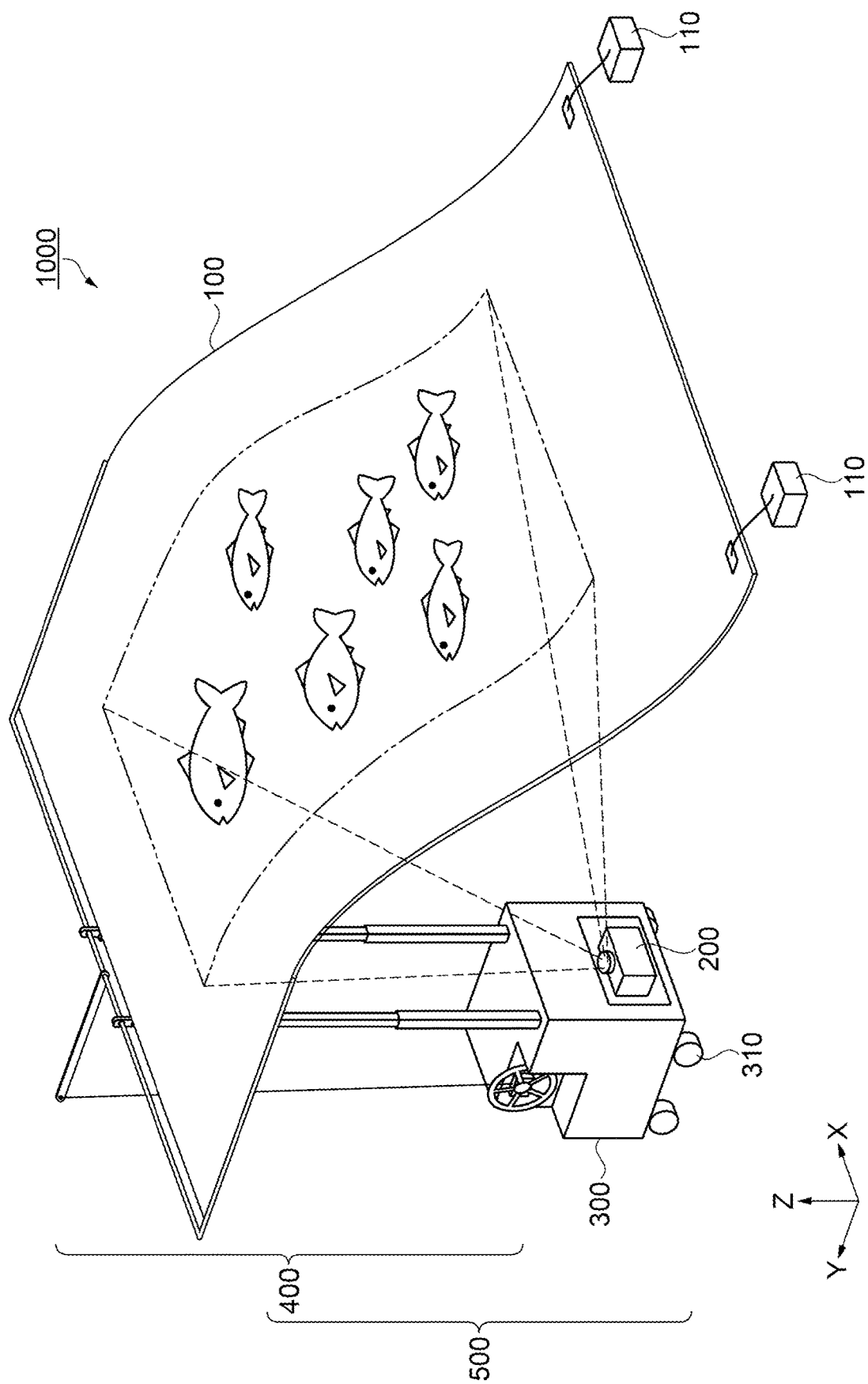
FIG. 1 is a perspective view showing a configuration of a projection system.
Figure 2:
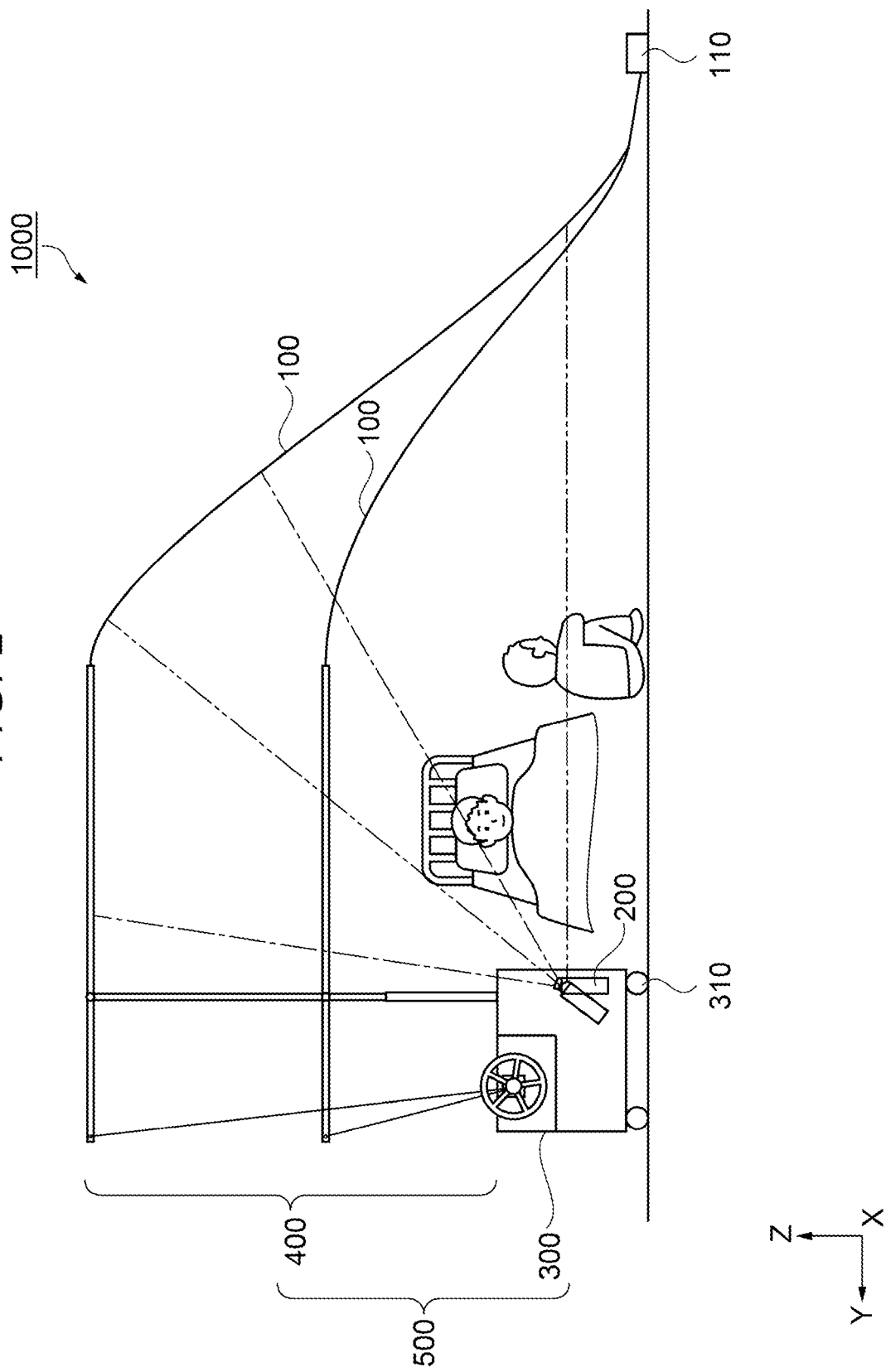
FIG. 2 is a side view showing a configuration of a projection system.

As shown in FIG. 1 and FIG. 2, the projection system 1000 is provided with a screen 100, an image projection device 200 for projecting an image or a picture on the screen 100, and a carrying platform 500 on which the image projection device 200 is mounted.

With this projection system 1000, for example, it is possible to enter a space below the screen 100 to watch the image from below the screen 100 in a sitting position, or watch the image while lying down on a bed as shown in FIG. 2.

The screen 100 is formed of a material having flexibility and semi-permeability. For example, the screen 100 is formed of a thin cloth material so thin as to flap in the wind. An end portion of the screen 100 is fixed to a weight 110 as a positioning mechanism via, for example, a cord.

The image projection device 200 is, for example, a short-focus projector, and projects the image on the screen 100 which is located obliquely upward, and is curved.

The carrying platform 500 has, for example, a carrying box 300 made of wood. To a lower surface of the carrying box 300, there are attached rollers 310. Therefore, it is possible to freely move the image projection device 200 and the screen 100 to a place where the user wants the image projection device 200 and the screen 100 to be installed.

Further, the carrying platform 500 has a support mechanism 400 capable of adjusting the position of the screen 100 in a direction crossing an installation surface to which the carrying box 300 is installed, specifically, a height direction as the Z direction. The screen 100 is supported by the support mechanism 400.

Figure 3:
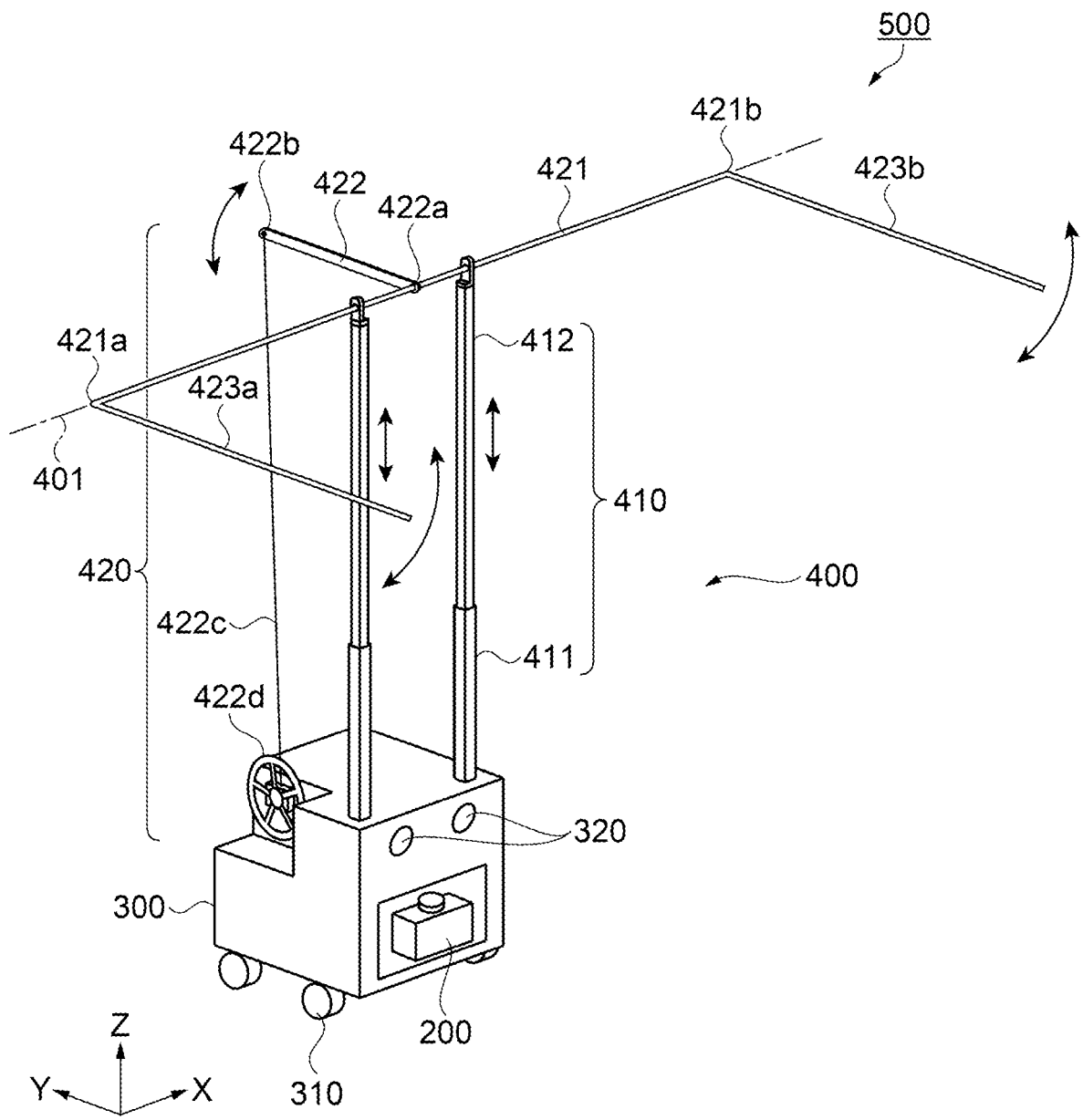
FIG. 3 is a perspective view showing a configuration of a carrying platform.

Then, with reference to FIG. 3 and FIG. 4, a configuration of the carrying platform 500 will be described.

As described above, the carrying platform 500 has the carrying box 300 and the support mechanism 400. Further, the carrying platform 500 has a projection direction variable part 250 (see FIG. 7) for varying a projection direction of the image by the image projection device 200. It should be noted that the explanation of the projection direction variable part 250 will be described later.

The support mechanism 400 has first position adjustment mechanisms 410 for adjusting the height of the screen 100 in the Z direction, and a second position adjustment mechanism 420 for adjusting a position of the screen 100 in a direction crossing the Z direction.

The first position adjustment mechanisms 410 each have a first height adjusting pipe 411 and a second height adjusting pipe 412. The first height adjusting pipe 411 is, for example, a prismatic pipe, and is fixed to the carrying box 300. The second height adjusting pipe 412 is made as a prismatic pipe narrower than the first height adjusting pipe 411, and is fixed to the first height adjusting pipe 411. Specifically, although not shown in the drawings, in each of the first position adjustment mechanisms 410, the second height adjusting pipe 412 is slidably arranged in the first height adjusting pipe 411.

Figure 4:
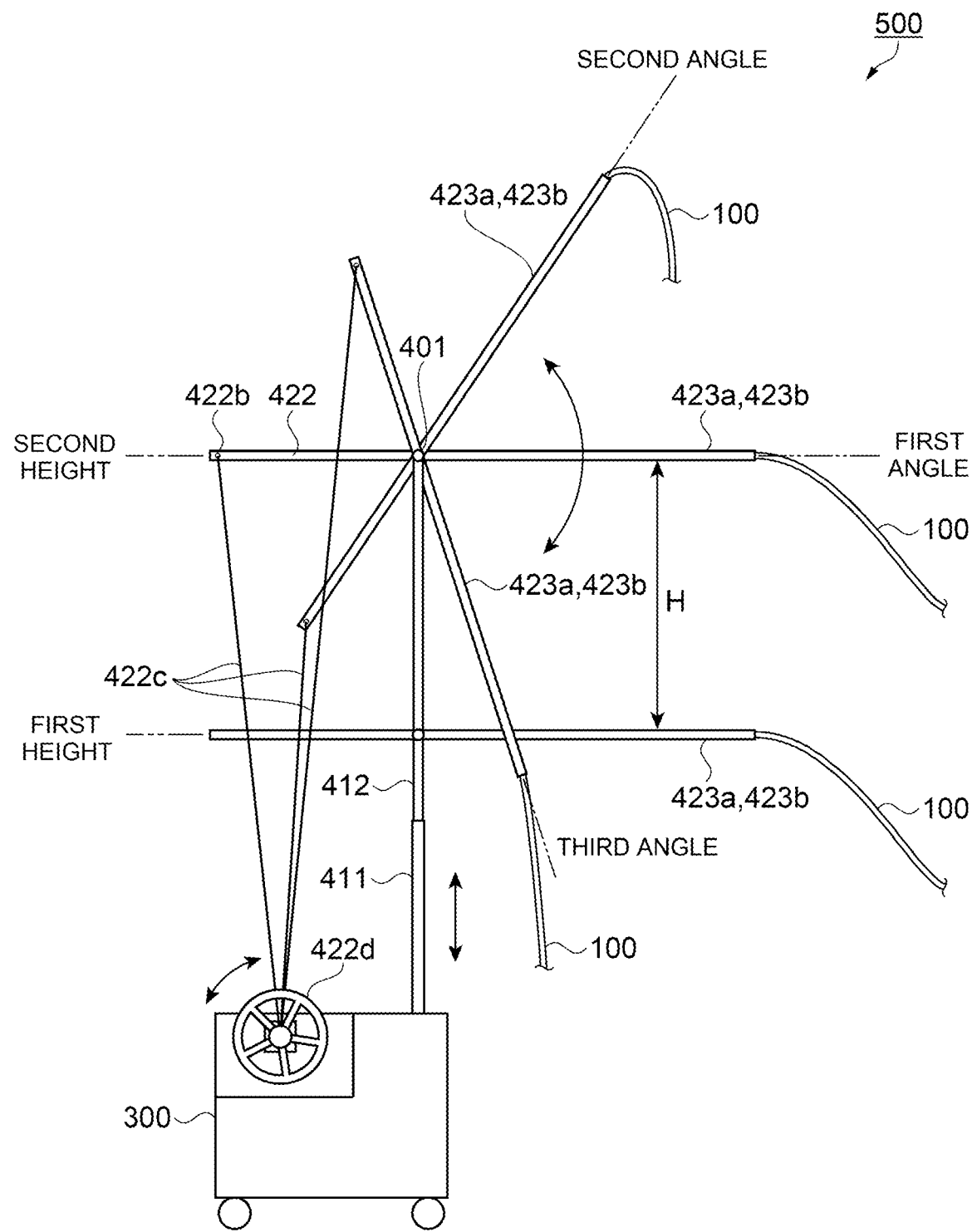
FIG. 4 is a side view showing a configuration of the carrying platform.

As shown in FIG. 4, by inserting the second height adjusting pipe 412 into the first height adjusting pipe 411, it is possible to lower the height of the screen 100, namely set the height to a first height. By drawing the second height adjusting pipe 412 from the first height adjusting pipe 411, it is possible to heighten the height of the screen 100, namely set the height to a second height. In other words, it is possible to change the position of the screen 100 as much as a height H.

It should be noted that as a method of fixing the second height adjusting pipe 412 and the first height adjusting pipe 411 to each other, it is possible to use a knob screw not shown. Specifically, the knob screw is loosened and then the length of the second height adjusting pipe 412 is adjusted, and after the adjustment is completed, the knob screw is tightened to fix the second height adjusting pipe 412 to the first height adjusting pipe 411.

Further, at the −Y direction side of the carrying box 300, there is arranged a speaker 320. The speaker 320 is provided with an enclosure disposed, for example, in the carrying box 300 so as to surround a back surface of the speaker 320 in order to improve a quality of a sound output from the speaker 320. The speaker 320 is coupled to a player or an amplifier not shown.

The second position adjustment mechanism 420 has a first column part 421 extending in the X direction as a first direction, a second column part 422 extending in the +Y direction as a second direction with respect to the extending direction of the first column part 421, and arm parts 423 each extending in the −Y direction as a third direction with respect to the extending direction of the first column part 421.

The first column part 421 is, for example, a cylindrical pipe, and is rotatably supported by the second height adjusting pipes 412 of the first position adjustment mechanism 410.

The second column part 422 extends in the +Y direction as an opposite side to the side at which the screen 100 is arranged, and one end portion 422a is fixed to a central portion of the first column part 421. The other end portion 422b of the second column part 422 is coupled to a handle 422d as an operating part via a wire 422c.

By rotating the handle 422d to move the other end portion 422b of the second column part 422 in an up-and-down direction, the first column part 421 fixed to the one end portion 422a of the second column part 422 rotates, specifically, rotates centering on a rotational axis 401.

The arm parts 423 have a first arm part 423a and a second arm part 423b, and extend in the −Y direction as the third direction opposite to the second direction to support the screen 100. Specifically, the first arm part 423a is fixed to one end portion 421a of the first column part 421. The second arm part 423b is fixed to the other end portion 421b of the first column part 421.

Then, a method of adjusting an angle of the screen 100 will be described. For example, in an initial stage, the arm parts 423a, 423b are fixed to a first angle (see FIG. 4) parallel to an installation surface, and the screen 100 is set in a state shown in FIG. 1.

As shown in FIG. 4, first, by rotating the handle 422d to pull the wire 422c, a position of the other end portion 422b of the second column part 422 lowers, and the first column part 421 rotates centering on the rotational axis 401. In association with the above, tips of the arm parts 423a, 423b fixed to the first column part 421 lift, and the screen 100 is arranged at a second angle.

In contrast, by rotating the handle 422d in a reverse direction to loosen the wire 422c, the position of the other end portion 422b of the second column part 422 heightens, and the first column part 421 rotates centering on the rotational axis 401. In association with the above, the tips of the arm parts 423a, 423b fixed to the first column part 421 drop, and the screen 100 is arranged at a third angle.

As described above, it becomes possible to change the height and the angle of the screen 100 using the first position adjustment mechanism 410 and the second position adjustment mechanism 420, and thus, it is possible to realize a variety of video expressions. Further, for example, even when the screen 100 is located at a height beyond the user's reach, it is possible to easily change the angle of the screen 100 by operating the handle 422d.

Further, when rotating the handle 422d rightward and leftward, namely in the +Y direction and the −Y direction, the angle of the screen 100 changes to provide a feeling of a flittering motion. Further, it is possible to wind the screen 100. Thus, it is possible to enrich the expressions of images and pictures. Further, by moving the screen 100 to and from a person lying down on a bed, it is also possible to appreciate variations of images and pictures. It should be noted that the images and the pictures projected on the screen 100 are defocused in some cases, but this can also be appreciated as a variation of the images and the pictures.

Then, configurations of the first column part 421, the second column part 422, and the arm pars 423a, 423b constituting the second position adjustment mechanism 420 will specifically be described with reference to FIG. 5 and FIG. 6.

Figure 5:
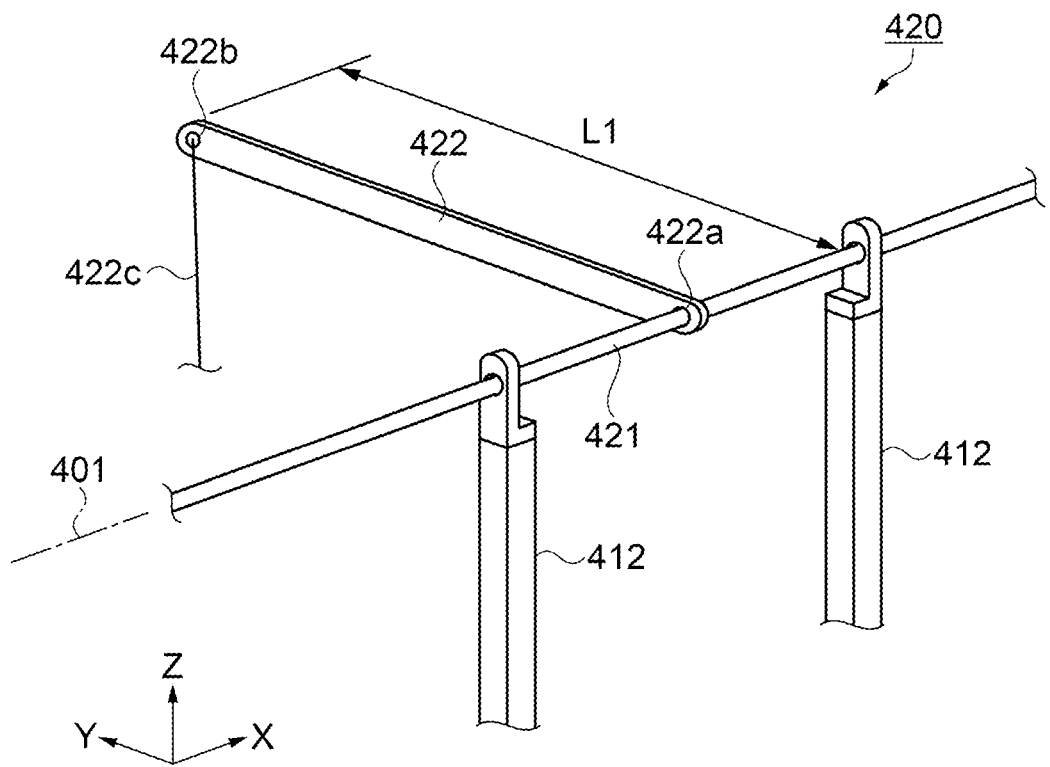
FIG. 5 is a perspective view showing a configuration of a part of a second position adjustment mechanism.

As shown in FIG. 5, the first column part 421 is arranged slidably to the second height adjusting pipes 412. The second column part 422 is provided with a through hole in the one end portion 422a, and the first column part 421 is inserted into the through hole. Further, the second column part 422 is fixed with an adhesive or the like so as not to rotate in order to gear the second column part 422 with the rotational operation of the first column part 421.

Further, to the other end portion 422b of the second column part 422, there is provided a through hole. The wire 422c is threaded through this through hole, and is then fixed. The screen 100 is attached to the arm parts 423a, 423b, for example, and tension is applied to the other end portion 422b of the second column part 422 so as to be pulled upward due to the weight of the screen 100.

Figure 6:
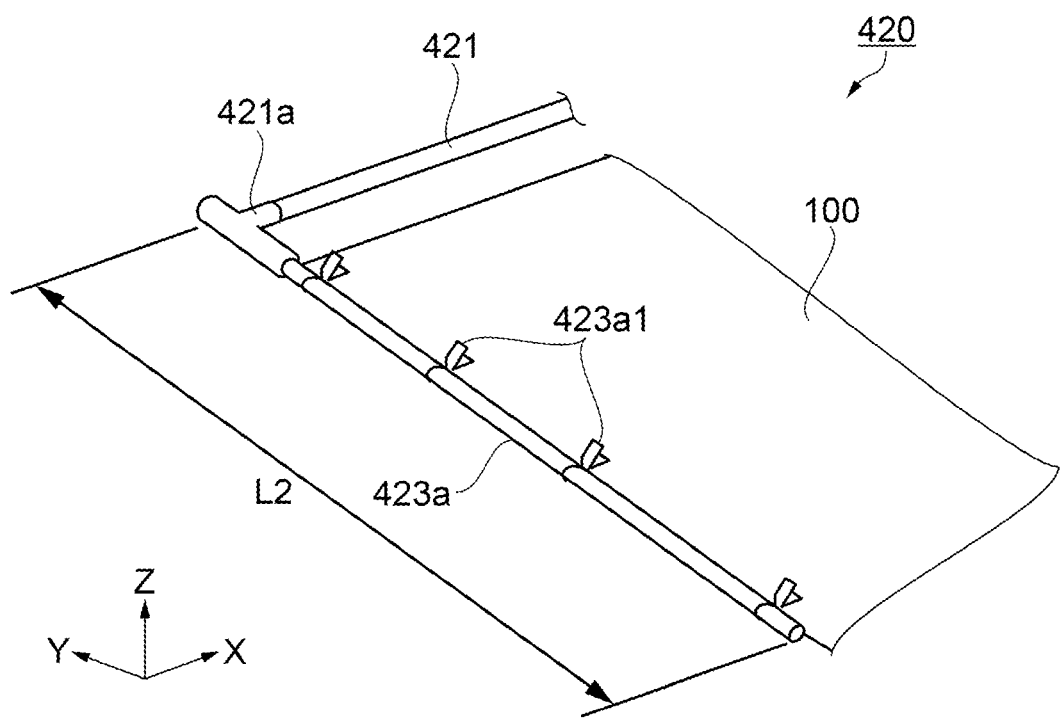
FIG. 6 is a perspective view showing a configuration of a part of the second position adjustment mechanism.

As shown in FIG. 6, the first arm part 423a is fixed to the one end portion 421a of the first column part 421 via, for example, a T joint. The first arm part 423a is provided with a plurality of clips 423a1 for fixing the screen 100. It should be noted that the second arm part 423b is the same in configuration as the first arm part 423a.

By the first arm part 423a and the second arm part 423b being arranged, there is created a space below the screen 100. Therefore, it is made possible for the user to enter the space (see FIG. 2).

Further, it is also made possible to project an image on the screen 100 between the first arm part 423a and the second arm part 423b, and it is possible to create a space for the user to feel as if the user were located in a cave.

Further, as shown in FIG. 5 and FIG. 6, a length L1 of the second column part 422, specifically a length from the one end portion 422a to the other end portion 422b, is shorter than a length L2 of the arm parts 423a, 423b, specifically a length from one end portion to the other end portion of each of the arm parts 423*a*, 423*b*. In other words, a length between the rotational axis 401 and the other end portion 422*b* of the second column part 422 is shorter than a length between the rotational axis 401 and the other end portion of each of the arm parts 423*a*, 423*b* at an opposite side to one end portion fixed to the first column part 421 in each of the arm parts 423*a*, 423*b*.

According to this configuration, since the rotational axis 401 of the first column parts 421 is taken as a fulcrum using the principle of leverage, when moving the second column part 422 short in length L1 as the point of load, it is possible to move the arm parts 423*a*, 423*b* long in length L2 as the point of effort. Therefore, it is possible to widely move the screen 100 even with a small action.

Then, a configuration of the projection direction variable part 250 constituting the carrying platform 500 will be described with reference to FIG. 7.

Figure 7:
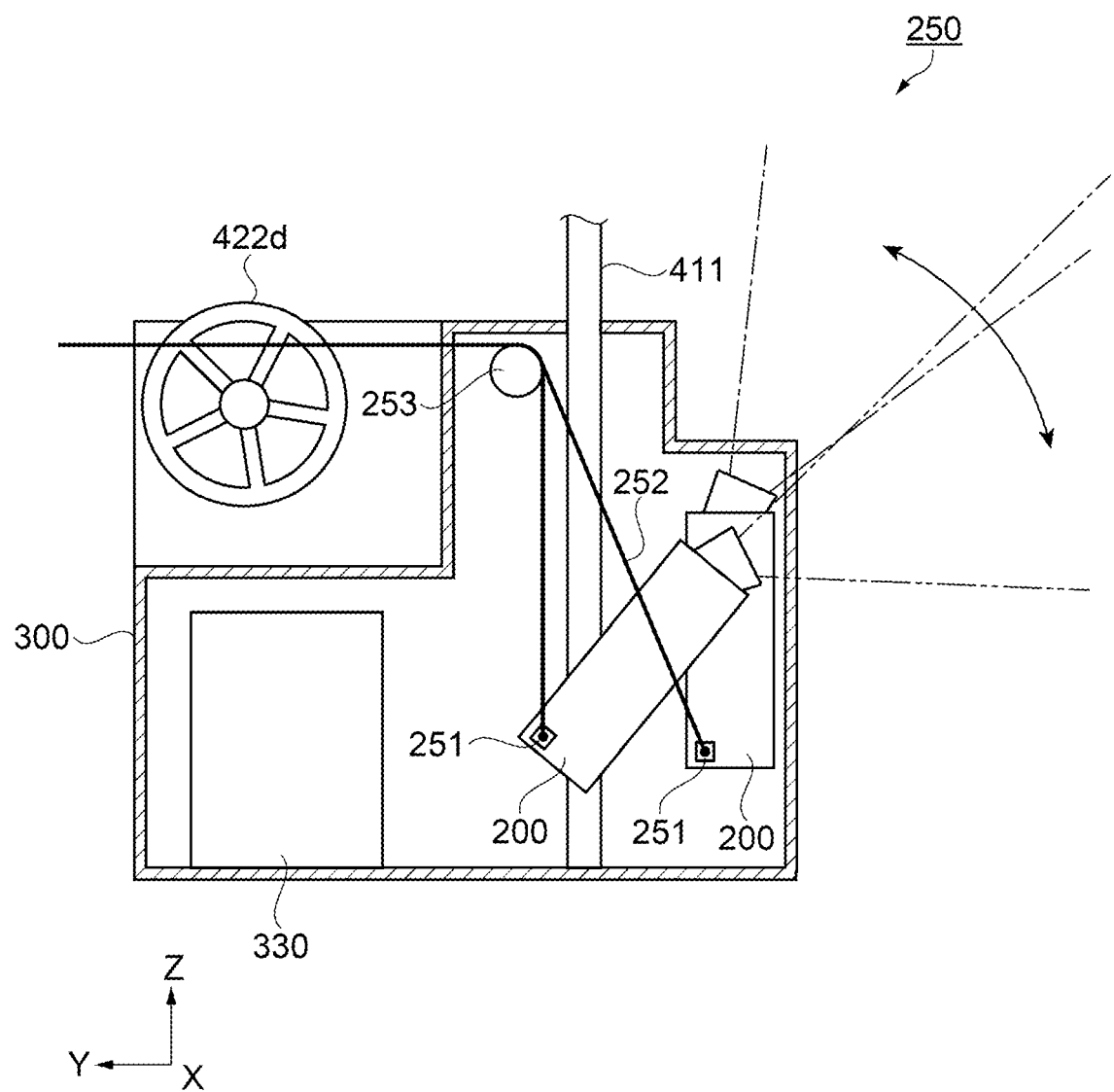
FIG. 7 is a cross-sectional view showing a configuration of a projection direction variable part.

As shown in FIG. 7, the projection direction variable part 250 changes the projection direction of the image of the image projection device 200. As described above, the image projection device 200 is a short-focus projector using, for example, a concave mirror or an optical-axis-bending projection optical system, and is arranged vertically. On the periphery of the image projection device 200, there is arranged a chassis for guiding the image projection device 200. In this chassis, there is disposed a fixation part 251 for fixing the wire 252. The fixation part 251 can directly be provided to the chassis of the image projection device 200.

The wire 252 is drawn toward the +Y direction side of the carrying box 300 via a pulley 253, and is fixed to a lever not shown. By moving the lever to pull the wire 252, it is possible to change the projection direction of the image of the image projection device 200. On the other hand, by moving the lever to loosen the wire 252, it is possible to restore the projection direction of the image of the image projection device 200.

Further, as shown in FIG. 7, in the carrying box 300, there is provided a battery 330. By using the battery 330, it is possible to make the image projection device 200 and acoustic equipment operate without being affected by the installation location.

As described hereinabove, the projection system 1000 according to the present embodiment is provided with the screen 100, the image projection device 200 for projecting an image on the screen 100, and the carrying platform 500 on which the image projection device 200 is installed, and at the same time, which can move, wherein the carrying platform 500 includes the projection direction variable part 250 for varying the projection direction of the image, and the support mechanism 400 for supporting the screen 100 so that the position of the screen 100 can be adjusted in the direction crossing the installation surface on which the carrying platform 500 is installed.

According to this configuration, by moving the position of the screen 100 up and down in a direction crossing the installation surface such as an up-and-down direction using the support mechanism 400, it becomes possible to change the posture of the screen 100, and thus, it is possible to change the vision of the image to be projected. In other words, it is possible to enhance a diversity of the video expressions. In addition, since the direction in which the image is projected is changed by the projection direction variable part 250, it is possible to change the vision of the image. Further, since the image projection device 200 is mounted on the carrying platform 500, it is possible to enhance the easiness in installing the screen 100.

Further, in the projection system 100 according to the present embodiment, it is preferable for the support mechanism 400 to have the first position adjustment mechanism 410 for adjusting the position where the screen 100 is supported in the direction of the height from the installation surface, and the second position adjustment mechanism 420 for adjusting the position where the screen 100 is supported in the direction crossing the height direction. According to this configuration, since the position of the screen 100 in the height direction is adjusted by the first position adjustment mechanism 410, and the position of the screen 100 in the direction crossing the height direction is adjusted by the second position adjustment mechanism 420, it is possible to realize a wider variety of video expressions.

Further, in the projection system 1000 according to the present embodiment, it is preferable for the second position adjustment mechanism 420 to include the first column part 421 which is rotatably supported by the first position adjustment mechanism 410, and which extends in the first direction parallel to the installation surface, the second column part 422 which extends in the second direction crossing the first direction, the one end portion 422*a* of which is fixed to the central portion of the first column part 421, and which rotates around the rotational axis 401 along the first direction of the first column part 421, the handle 422*d* which is coupled to the other end portion 422*b* of the second column part 422, and which rotates the second column part 422, and the arm parts 423*a*, 423*b* which are respectively disposed in the one end portion 421*a* of the first column part 421 and the other end portion 421*b* of the first column part 421, which extend in the third direction opposite to the second direction, and which support the screen 100.

According to this configuration, by the handle 422*d* moving the other end portion 422*b* of the second column part 422 in the height direction, the first column part 421 fixed to the second column part 422 rotates around the rotational axis 401, and by the first column part 421 rotating, the two arm parts 423*a*, 423*b* rotate in the height direction. Therefore, by operating the handle 422*d*, it becomes possible to change the angle and the height of the screen 100, and thus, it is possible to realize a variety of vides expressions. Further, for example, even when the screen 100 is located at a height beyond the user's reach, it is possible to easily make the arm parts 423*a*, 423*b* perform a rotational action by operating the handle 422*d*.

Further, in the projection system 1000 according to the present embodiment, it is preferable for the length of the second column part 422 to be shorter than the length between the one end portion and the other end portion in each of the arm parts 423*a*, 423*b*. According to this configuration, since the first column part 421 is rotatably supported by the first position adjustment mechanism 410, in other words, the first column part 421 is taken as the fulcrum using the principle of leverage, when moving the other end portion 422*b* of the second column part 422 short in length as the point of load, it is possible to rotate the arm parts 423*a*, 423*b* long in length as the point of effort. Therefore, it is possible to widely move the screen 100 even with a small action. In other words, it is possible to easily install the screen 100.

Further, in the projection system 1000 according to the present embodiment, it is preferable for the carrying platform 500 to be provided with the battery 330 for supplying the image projection device 200 with electrical power. According to this configuration, since the battery 330 is provided, even when there is no outlet for supplying the electrical power in the surroundings, it is possible to stably supply the image projection device 200 with the electrical power. Therefore, even in a location such as an event, it becomes possible to increase the freedom of installation of the carrying platform 500, and thus, it is possible to perform a more sophisticated space rendering.

Further, in the projection system 1000 according to the present embodiment, it is preferable to provide a weight 110 for positioning the screen 100 on the installation surface at an opposite side to the support mechanism 400 in the screen 100. According to this configuration, since the position of the end portion of the screen 100 is fixed by the weight 110, in other words, the end portion of the screen 100 is fixed, by operating the first position adjustment mechanism 410 and the second position adjustment mechanism 420, it is possible to easily change the height and the angle of the screen 100.

Hereinafter, a modified example of the embodiment described above will be described.

Figure 8:
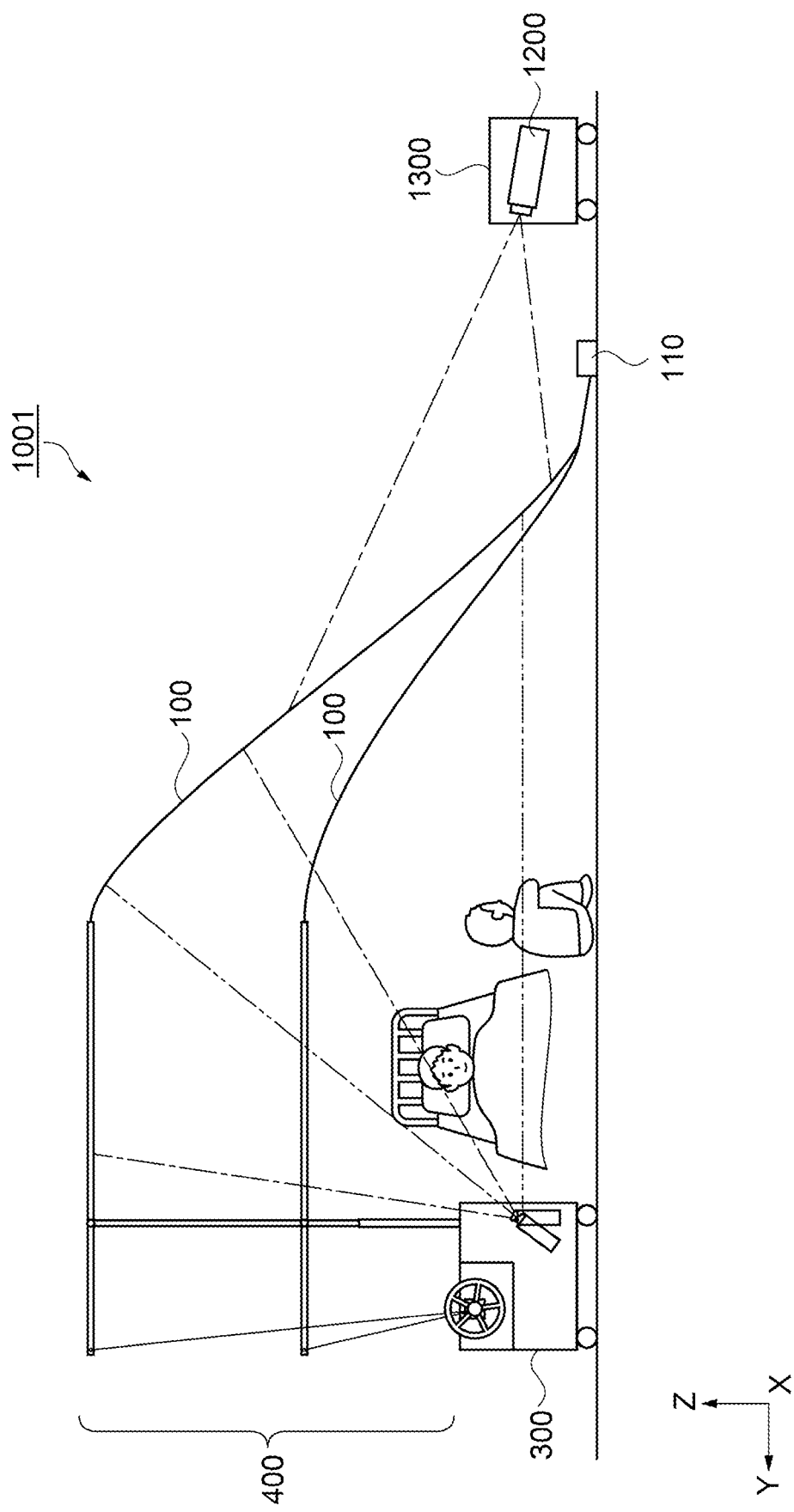
FIG. 8 is a side view showing a configuration of a projection system according to a modified example.

As described above, projecting the images and the pictures on the screen 100 from the inside covered with the screen 100 is not a limitation, and it is possible to adopt such a configuration as shown in FIG. 8. FIG. 8 is a side view showing a configuration of a projection system 1001 according to a modified example.

As shown in FIG. 8, the projection system 1001 according to the modified example projects the images and the pictures on the screen 100 from the outside of the screen 100 in addition to the functions of the embodiment described above. Specifically, in the outside of the screen 100, namely at the −Y direction side, there is arranged a carrying platform 1300 mounting another image projection device 1200. By adopting such a configuration, it is possible to further enhance the diversity of the video expressions. Further, appreciating the images and the pictures from the inside covered with the screen 100 is not a limitation, and it is possible to arrange to appreciate them from the outside of the screen 100.

As described above, the first position adjustment mechanism 410 is not limited to sliding only the second height adjusting pipes 412, and can be arranged to also slide the first height adjusting pipes 411. Specifically, it is possible to slide the first height adjusting pipes 411 in the up-and-down direction with respect to the carrying box 300 using linear guides or the like.

As described above, fixing the first height adjusting pipes 411 and the second height adjusting pipes 412 to each other with the knob screws is not a limitation, and it is possible to arrange that, for example, both of the first height adjusting pipes 411 and the second height adjusting pipes 412 are provided with through holes, and the height adjustment is achieved by inserting pins into the through holes.

As described above, arranging the image projection device 200 vertically is not a limitation, and it is possible to arrange the image projection device 200 on a floor in the carrying box 300.

As described above, the operation of rotating the handle 422d to change the angle of the screen 100 is not a limitation, and it is possible to arrange that the wire 422c is electrically wound and loosened.

What is claimed is:

1. A projection system comprising:
a screen;
an image projection device configured to project an image on the screen; and
a carrying platform on which the image projection device is mounted, and which is configured to move, wherein the carrying platform includes
a projection direction variable part which is configured to change a projection direction of the image, and
a support mechanism configured to support the screen so as to adjust a position of the screen in a direction crossing an installation surface on which the carrying platform is installed, wherein the support mechanism includes:
a first position adjustment mechanism configured to adjust a position where the screen is supported in a height direction from the installation surface, and
a second position adjustment mechanism configured to adjust a position where the screen is supported in a direction crossing the height direction, wherein the second position adjustment mechanism includes:
a first column part which is rotatably supported by the first position adjustment mechanism, and which extends in a first direction parallel to the installation surface,
a second column part which extends in a second direction crossing the first direction, which is fixed to a central portion of the first column part at the one end portions of the second column part, and which rotates around a rotational axis along the first direction of the first column part,
an operating part which is coupled to another of the end portions of the second column part, and which rotates the second column part, and
arm parts which are respectively provided to one of end portions of the first column part and another of the end portions of the first column part, which extend in a third direction opposite to the second direction, and which support the screen.

2. The projection system according to claim 1, wherein a first length between the rotational axis and the another of the end portions of the second column part is shorter than a second length between the rotational axis and one of end portions of the arm parts at an opposite side to another of the end portions of the arm parts fixed to the first column part.

3. The projection system according to claim 1, wherein the carrying platform is provided with a battery configured to supply the image projection device with electrical power.

4. The projection system according to claim 1 further comprising:
a positioning mechanism which is located at an opposite side to the support mechanism in the screen, and which positions the screen on the installation surface.

* * * * *